though aliphatic or aromatic mono- or polymercaptans

2,703,785

SOLUBLE COMPOSITIONS CONTAINING A 2,5-DI-MERCAPTO-1,3,4-THIADIAZOLE DERIVATIVE

Edward N. Roberts, Hammond, Ind., and Ellis K. Fields, Chicago, and John S. Brown, Flossmoor, Ill., assignors to Standard Oil Company, Chicago, Ill., a corporation of Indiana No Drawing. Application February 27, 1953, Serial No. 339,462

17 Claims. (Cl. 252—33.4)

This invention relates to improvements in soluble oil compositions and more particularly relates to soluble oil compositions having improved bactericidal, rust-inhibiting and stability properties.

Soluble oils are homogenous compositions containing as principal ingredients hydrocarbon oils and an emulsifying agent and smaller amounts of other components to impart various specific properties to the soluble oil composition. The components and their relative proportions are carefully chosen to achieve a "balanced" clear stable composition which will disperse on contact with water to form a fine stable milk-like emulsion.

The soluble oils have many uses which are well known to the art. One of the most important uses is as lubricating and cooling agents in the cold working of metals, such as in grinding, cutting and threading operations. For this use the soluble oil is dispersed in from about 10 to about 80 or more times its own volume of water and circulated over the contact point of the working tool and the metal being worked on. Frequently, difficulty is encountered in this type of operation due to the tendency of the soluble oil emulsion or dispersion to cause rusting of metals in contact with such emulsions, particularly ferrous metals, and also because in the course of time these emulsions or dispersions develop strong, putrid, undesirable odors. Heretofore it has been the practice to overcome such trouble by incorporating in soluble oil compositions, among other ingredients, a bactericide and a suitable rust-inhibitor.

It is an object of the present invention to provide an improved soluble oil composition having bactericidal and rust-inhibiting properties. Another object of the invention is to provide a soluble oil composition having incorporated therein as a single component a compound exhibiting bactericidal and rust-inhibiting properties. Still another object of the invention is to provide a soluble oil composition which is stable and which will inhibit the growth of bacteria and the development of rust. A further object of the invention is to provide a soluble oil emulsion which is stable and non-rusting to ferrous metal and which exhibits bactericidal properties. Another object of the invention is to provide a method of inhibiting rusting and bacteria growth in soluble oil compositions. Other objects and advantages of the invention will become apparent upon the following description thereof.

In accordance with the present invention, the foregoing objects can be attained by providing a soluble oil composition comprising essentially from about 50% to about 90% of a hydrocarbon oil, from about 5% to about 40% of an emulsifying agent, and from about 0.5% to about 10% of an oil-soluble reaction product of an aldehyde, a mercaptan, and 2,5-dimercapto-1,3,4-thiadiazole in the molar ratio of from 2:2:1 to 10:2:9, and preferably in the molar ratio of 2:2:1. For brevity, the reaction product will be referred to hereinafter as the 1,3,4-thiadiazole derivative.

In general, the reaction is carried out by adding an aldehyde to a mixture of the mercaptan and the dimercapto-thiadiazole, and heating the mixture at temperatures of from about 40° C. to about 140° C. for a period of from 20 minutes to about 16 hours. Preferably, the reaction is carried out in the presence of a suitable solvent, such as by way of example, dioxane, ethylene glycol, dimethyl and diethyl ethers, and diethylene glycol dimethyl and diethyl ethers. At the end of the reaction period the solvent and the water produced in the reaction are removed from the reaction product, preferably by stripping in a vacuum, and the stripped product filtered if necessary.

The aldehyde employed may be an aliphatic, an aromatic, or a heterocyclic aldehyde of from about 1 to about 20 or more carbon atoms, and may contain substituents, such as alkoxy, hydroxy, alkyl mercapto, halogen or nitro groups. Examples of suitable aldehydes are formaldehyde, acetaldehyde, benzaldehyde, 2-ethylhexyl aldehyde, butyraldehyde, heptaldehyde, caprylic aldehyde, acrylicaldehyde, crotonaldehyde, vinyl acetaldehyde, phenyl acetaldehyde, nitrobenzaldehyde, salicylaldehyde, furfural, chloral, etc. Of the aldehydes, the aliphatic aldehydes, particularly the low molecular weight aldehydes, such as formaldehyde, are preferred.

Any mercaptan can be employed in the reaction, although aliphatic or aromatic mono- or polymercaptans containing from about 1 to about 30 carbon atoms, and preferably from about 6 to about 20 carbon atoms, are preferred. For bacteria growth control, better results are usually obtained with aliphatic mercaptans of from about 8 to about 12 carbon atoms. Examples of suitable mercaptans are ethyl mercaptan, butyl mercaptan, hexyl mercaptan, octyl mercaptan, nonyl mercaptan, octadecyl mercaptan, thiophenol, etc.

Although the herein-described thiadiazole derivatives all exhibit, to a definite degree, anti-rust properties, E. P. properties and bacteria growth control properties, all are not necessarily equivalent in their effectiveness, since, depending upon the nature and severity of the service in which thy are used, some variation in effectiveness may be exhibited.

The preparation of the above-described reaction products is illustrated by the following examples, which are given by way of illustration and are not intended to limit the scope of the invention.

EXAMPLE I

A mixture of 60 grams (0.4 mol.) of 2,5-dimercapto-1,3,4-thiadiazole and 116.8 grams (0.8 mol) tertiary octyl mercaptan was dissolved in 300 cc. dioxane at 70° C. To the stirred hot solution was added, drop-wise, 66 cc. of 36% aqueous formaldehyde over a thirty-minute period. Stirring was continued at 100° C. for one and one-half hours and the mixture then stripped in vacuo and filtered through celite. A yield of 143 grams of a viscous yellow product was obtained which analyzed as follows:

| | Per cent |
|---|---|
| Carbon | 44.22 |
| Hydrogen | 6.35 |
| Sulfur | 37.0 |
| Nitrogen | 7.9 |

EXAMPLE II

To a solution of 45 grams (0.3 mol.) of 2,5-dimercapto-1,3,4-thiadiazole and 121.2 grams (0.6 mol.) of tertiary dodecyl mercaptan in 200 cc. dioxane, heated to 65° C. was added, drop-wise, 49.5 cc. 36% aqueous formaldehyde over a twenty-minute period. The mixture was stirred for two and one-half hours at 100° C., stripped in vacuo and filtered through celite. A yield of 154 grams of a viscous yellow product was obtained which analyzed as follows:

| | Per cent |
|---|---|
| Carbon | 56.16 |
| Hydrogen | 8.76 |
| Sulfur | 26.9 |
| Nitrogen | 4.63 |

EXAMPLE III

A mixture of 30 grams (.2 mol.) 2,5-dimercapto-1,3,4-thiadiazole, 58.4 grams (0.4 mol.) tertiary octyl mercaptan and 51.2 grams (0.4 mol.) 2-ethylhexaldehyde in 75 cc. dioxane, was heated at 115° C. for four hours, stripped in vacuo to remove the diluent and the water of reaction, and filtered through celite. 100 grams of a viscous yellow product were obtained.

EXAMPLE IV

A mixture of 45 grams (.3 mol.) 2,5-dimercapto-1,3,4-thiadiazole and 102 cc. (.6 mol.) tertiary octyl mercaptan was stirred at 90° C. and treated drop-wise with 61 cc. benzaldehyde over a thirty-five minute period. The mixture was stirred at 100° C. for two hours, stripped in vacuo and filtered through celite plus a little alumina. The product, 175 grams, was a very viscous yellow-orange liquid completely soluble in naphtha. The product contained 27.4% sulfur and 4.9% nitrogen.

EXAMPLE V 50 cc. of furfural (.6 mol.) was added, drop-wise, to a mixture of 102 cc. (.6 mol.) tertiary octyl mercaptan and 45 grams (.3 mol.) 2,5-dimercapto-1,3,4-thiadiazole and the mixture stirred for two hours at a temperature of 90° C. The reaction product was then stripped in vacuo and filtered while warm. The product, 120 grams, was a dark purple viscous material having a sulfur content of 25.1% and a nitrogen content of 4.4%.

EXAMPLE VI

To a stirred mixture of 41 cc. (.4 mol.) thiophenol and 30 grams (.2 mol.) 2,5-dimercapto-1,3,4-thiadiazole at 75°–80° C. was added 56 cc. (0.4 mol.) heptaldehyde, drop-wise, over a fifteen-minute period. Stirring was continued for two hours at 100° C. The mixture was stripped at 120° C. and 4 millimeters pressure, then filtered hot through a little celite. The product, 94 grams, was a viscous orange oil.

Instead of reacting 2,5-dimercapto-1,3,4-thiadiazole with the mercaptan and aldehyde as above-described in the preparation of the additive, we may carry out the reaction by forming in situ the dimercapto-thiadiazole and reacting the same with the aldehyde and mercaptan as illustrated by the following example:

EXAMPLE VII

To a mixture of 150 grams of cracked ice and 130.5 cc. of 84% hydrozine hydrate was added 280 cc. of carbon disulfide over a period of ten minutes. While cooling the mixture externally, a solution of 180 grams of sodium hydroxide in 325 cc. of water and 30 cc. of ethyl alcohol was added, drop-wise, to the cooled mixture while maintaining a temperature of about 50° C. or lower. The mixture was then stirred and refluxed at 85° C. for three hours, cooled and acidified with 120 cc. of concentrated sulfuric acid diluted with 200 grams of ice. To the resulting slurry of 2,5-dimercapto-1,3,4-thiadiazole in sodium sulfate solution was added 1000 cc. of tertiary octyl mercaptan, and then with vigorous agitation was added, drop-wise, 374 cc. of 37% aqueous formaldehyde. The resultant mixture was heated at 85° C. for two hours and cooled to room temperature (about 23° C.). The mixture separated into a lower solidified layer of sodium sulfate and an upper liquid layer. The latter was decanted, treated with 10 grams of sodium bicarbonate, then stripped in vacuo and filtered through celite; 610 grams of a light yellow liquid product was obtained.

In formulating the soluble oil composition the base oil can be any hydrocarbon oil, such as a mineral oil, of suitable viscosity. Usually, hydrocarbon oils having a Saybolt viscosity in the range from about 75 seconds to about 350 seconds at 100° F. are preferred, although, depending upon the intended use, hydrocarbon oils having a Saybolt viscosity upwards of about 60 seconds at 100° F. can be employed.

The emulsifying agents used in the formulation of soluble oil compositions are preferably alkali metal soaps, or ammonium soaps of preferentially oil-soluble sulfonic acids obtained in the treatment of hydrocarbon oils with strong or fuming sulfuric acid. The preferentially oil-soluble petroleum sulfonic acids, commonly referred to as mahogany acids because of their reddish-brown color, are well known in the art. These sulfonic acids are obtained by treating petroleum distillates of between about 50 to about 100 seconds Saybolt Universal viscosity at 100° F. with between about 3 to 9 pounds, and preferably between 3 and 6 pounds, of concentrated or fuming sulfuric acid per gallon of oil. After removal of the sulfuric acid sludge the acid-treated oil is extracted with a suitable aliphatic alcohol of about 60% strength to remove the preferentially oil-soluble petroleum sulfonic acids. The alcoholic fraction containing the sulfonic acid is then neutralized with a desired neutralizing agent, such as for example, sodium or potassium hydroxide or ammonia, the mixture allowed to settle, and the alcohol layer containing the mahogany acid soap drawn off. The alcohol is then removed by distillation under vacuum. To facilitate handling, the soaps are preferably dissolved in a petroleum oil to give a blend containing between 35% and about 50% soap. The molecular weights of the preferentially oil-soluble sulfonic acids obtained in the acid treatment of petroleum oils vary from about 420 to about 500, depending upon the petroleum oil treated and the amount of sulfuric acid employed. While any one of the preferentially oil-soluble sulfonic acids can be used, we prefer to use those acids having molecular weights within the range of 410 to 450, although soaps of mixtures of lower molecular weight sulfonic acids and higher sulfonic acids can be used.

In formulating soluble oil compositions it is frequently desirable to use in combination with the mahogany soaps other emulsifying agents or surface-active agents. For example, the mahogany soaps can be used in combination with potassium or sodium rosin soap or non-ionic surface-active agents, such as for example, polyoxyethylene sorbitan esters of mixed fatty and resin acids. A suitable ester of this type is a product marketed by the Atlas Powder Company as "G–8916–T." In addition to the basic components of soluble oil compositions, namely, the emulsifying agent and the hydrocarbon oil, other constituents are usually included, such as an alcohol, for example, isopropyl alcohol, ethyl alcohol, etc., oleic acid, mono-, di- or tri-ethanolamine, and usually a small amount of water sufficient to maintain the "balance" of the various components. For certain types of services, it is often the practice to incorporate in soluble oil compositions an extreme pressure agent, such as for example, sulfurized fatty oils, sulfurized sperm oil, or other organic compounds containing active sulfur, as well as chlorinated organic compounds. Chip settling agents, such as a hydroxy aromatic acid, for example, tannic acid, of the type claimed in copending Cafcas et al. application Serial Number 106,488 filed July 23, 1949, now U. S. 2,668,146, issued February 2, 1954, can also be incorporated in the soluble oil composition.

There are many soluble oil formulations known to the art and the present invention is not limited to the addition of the herein-described thiadiazole derivatives to any particular soluble oil base, but is applicable to the use of such thiadiazole derivatives to any basic soluble oil formula, for example, any of those of the following patents: Hughes 1,577,723; Johnson 1,619,074; Merrill 1,739,686; Adams 1,871,940; Strauch 1,909,080; Butts 1,979,250; Adams et al. 2,039,377; Adams et al. 2,243,994; Fabian et al. 2,097,085; Waugh 2,552,913, and others.

Illustrative of soluble oil formulations in which the herein-described thiadiazole derivatives are employed are the following examples, which are given only by way of illustration:

EXAMPLE A

| | Per cent |
|---|---|
| Sodium mahogany soap blend (50% soap–50% oil) | 30.0 |
| Dispersion agent [1] | 3.0 |
| Sulfurized sperm oil | 7.0 |
| Methyl lardate | 8.0 |
| Monoethanolamine | 1.0 |
| Thiadiazole derivative [2] | 2.0 |
| Petroleum oil | 49.0 |

[1] Polyoxyethylene sorbitan ester of mixed fatty and resin acids—marketed by Atlas Powder Company as G–8916–T.
[2] Reaction product of Example I.

EXAMPLE B

Same formula as Example A, except that the thiadiazole derivative was the reaction product of Example II.

|  | Example C | Example D |
|---|---|---|
|  | Percent | Percent |
| Sodium Mahogany Soap | 18.8 | 24.7 |
| Sodium Rosin Soap | 3.5 | 3.4 |
| Ethanol | 1.3 | 0.5 |
| Water | 0.8 | 0.5 |
| 48° Bé.-caustic Soda | 0.09 | 0.07 |
| Thiadiazole Derivative [1] | 1.8 | 1.9 |
| Petroleum Oil [2] | 73.71 | 17.3 |
| Petroleum Oil [3] |  | 51.63 |

[1] Reaction Product of Example I.
[2] SSU at 100° F.—80.
[3] SSU at 100° F.—180.

EXAMPLE E

|  | Per cent |
|---|---|
| Sodium mahogany soap | 16.2 |
| Triethanolamine | 0.15 |
| Tannic acid | 1.77 |
| Oleic acid | 0.18 |
| Ethanol | 0.9 |
| Petroleum oil | 78.1 |
| Thiadiazole derivative | 1.8 |

In each of the above formulations, the thiadiazole derivative can be any of the herein-disclosed reaction products of 2,5-dimercapto-1,3,4-thiadiazole, a mercaptan, and an aldehyde, such as for example, those described in Examples I to VIII, supra. Also, depending on the particular use and other conditions, the amount of thiadiazole derivative used in the above formulations can be varied from about 0.05% to about 10%.

While it is preferred to incorporate the herein-described thiadiazole derivatives in the soluble oil, it is, of course, possible to add the same to the dispersion of the soluble oil in water.

The effectiveness of the herein-described thiadiazole derivatives in inhibiting bacteria growth, rusting and in stabilizing emulsions is described by the data in Table I, below. These data were obtained by forming emulsions of one part soluble oils with 15 and 40 parts of heavily contaminated water containing dirt, fungi and bacteria, adding iron chips to the emulsions and air-blowing the emulsion for about five days at about 73° to 80° F. Bacterial counts were taken at the end of this time and the condition of the emulsion and iron chips noted. The following samples were subjected to the foregoing test:

Sample A.—Example A without the thiadiazole derivative.
Sample B.—Example A.
Sample C.—Example B.
Sample D.—Example C without the thiadiazole derivative.
Sample E.—Example C.

Table I

| Oil | Bacterial Count/cc. | Observations |
|---|---|---|
| Sample A: |  |  |
| 15:1 | 10,000 | Slight sludge and rust. |
| 40:1 | 30,000,000 | Dark brown, heavy sludge and rust. |
| Sample B: |  |  |
| 15:1 | Sterile | White emulsion, no sludge or rust. |
| 40:1 | 100,000 | Do. |
| Sample C: |  |  |
| 15:1 | Sterile | Tan, no sludge or rust. |
| 40:1 | 7,000,000 | Tan, slight sludge and rust. |
| Sample D: |  |  |
| 15:1 | 10,000,000 | Heavy sludge and rust. |
| 40:1 | 8,000,000 | Do. |
| Sample E: |  |  |
| 15:1 | Sterile | Light colored emulsion, no sludge or rust. |
| 40:1 | do | Do. |

The data show that the herein-described thiadiazole derivatives are effective bactericides and fungicides, keep the iron chips from rusting, and prevent the emulsion from sludging.

The ability of the herein-described thiadiazole derivatives to prevent seizure and welding of metal surfaces under conditions of extreme pressure when used in soluble oil compositions is demonstrated by the data in Table II obtained on the Almen E. P. machine. The following samples were used in the tests:

Sample A.—Supra.
Sample B.—Supra.
Sample D.—Supra.
Sample E.—Supra.
Sample F.—Example D without the thiadiazole derivative.
Sample G.—Example D.

Table II

| Sample (10:1 Emulsion) | Almen | |
|---|---|---|
|  | Pass | Fail |
| Sample A | 28 | 30 |
| Sample B | 30+ |  |
| Sample D | 4 | 6 |
| Sample E | 18 | 20 |
| Sample F | 10 | 12 |
| Sample G | 20 | 22 |

The herein-described oil compositions can contain, in addition to the herein-named components, other additives, such as other oiliness agents, anti-oxidants, additional E. P. agents, bactericides, etc.

Percentages given herein and in the appended claims are weight percentages unless otherwise specified.

The herein described oil-soluble reaction products of an aldehyde, a mercaptan and 2,5-dimercapto-1,3,4-thiadiazole are claimed as such and in oleaginous compositions in copending E. K. Fields application Serial No. 318,091 filed October 31, 1952.

While the present invention has been described by reference to specific embodiments thereof, these are given by way of illustration only, and the invention is not to be limited thereto, but includes within its scope such modifications and variations as come within the spirit of the appended claims.

We claim:

1. An emulsifiable soluble oil composition comprising a major proportion of a hydrocarbon oil, an emulsifying agent, and from about 0.5% to about 10% of the oil-soluble reaction product of an aldehyde, a mercaptan selected from the class consisting of an aliphatic mercaptan and an aromatic mercaptan, and 2,5-dimercapto-1,3,4-thiadiazole, said aldehyde, mercaptan and 2,5-dimercapto-1,3,4-thiadiazole being reacted in the molar ratio of from 2:2:1 to 10:2:9.

2. A soluble oil composition as described in claim 1 in which the aldehyde is an aliphatic aldehyde of from about 1 to about 20 carbon atoms.

3. A soluble oil composition as described in claim 2 in which the aliphatic aldehyde is formaldehyde.

4. A soluble oil composition as described in claim 2 in which the aliphatic aldehyde is 2-ethylhexaldehyde.

5. A soluble oil composition as described in claim 1 in which the aldehyde is an aromatic aldehyde.

6. A soluble oil composition as described in claim 5 in which the aromatic aldehyde is benzaldehyde.

7. A soluble oil composition as described in claim 5 in which the aromatic aldehyde is salicylaldehyde.

8. A soluble oil composition described in claim 1 in which the aldehyde is a heterocyclic aldehyde.

9. A soluble oil composition as described in claim 8 in which the heterocyclic aldehyde is furfural.

10. A soluble oil composition as described in claim 1 in which the mercaptan is octyl mercaptan.

11. A soluble oil composition as described in claim 1 in which the mercaptan is dodecyl mercaptan.

12. A soluble oil composition described in claim 1 in which the mercaptan is thiophenol.

13. An emulsifiable soluble oil composition comprising a major proportion of a hydrocarbon oil, from about 5% to about 40% of an alkali metal salt of a preferentially oil-soluble sulfonic acid, and from about 0.5% to about 10% of an oil-soluble reaction product of formaldehyde, an aliphatic mercaptan having from about 8 to about 12 carbon atoms and 2,5-dimercapto-1,3,4-thiadiazole, said formaldehyde, aliphatic mercaptan and 2,5-dimercapto-1,3,4-thiadiazole being reacted in the molar ratio of from 2:2:1 to 10:2:9.

14. An emulsifiable soluble oil composition comprising a major proportion of a hydrocarbon oil, from about 5% to about 40% sodium mahogany soap, and from about 0.5% to about 10% of an oil-soluble reaction product of formaldehyde, octyl mercaptan and 2,5-dimercapto-1,3,4-thiadiazole, said formaldehyde, octyl mercaptan and 2,5-dimercapto-1,3,4-thiadiazole being reacted in the molar ratio of from 2:2:1 to 10:2:9.

15. An emulsifiable soluble oil composition comprising a major proportion of a hydrocarbon oil, from about 5% to about 40% of sodium mahogany soap, and from about 0.5% to about 10% of an oil-soluble reaction product of formaldehyde, dodecyl mercaptan, and 2,5-dimercapto-1,3,4-thiadiazole, said formaldehyde, dodecyl mercaptan and 2,5-dimercapto-1,3,4-thiadiazole being reacted in the molar ratio of from 2:2:1 to 10:2:9.

16. A dilute dispersion in water of an emulsifiable soluble oil composition comprising a major proportion of a hydrocarbon oil and an emulsifying agent, said dispersion containing an oil-soluble reaction product of formaldehyde, an aliphatic mercaptan containing from about 8 to about 12 carbon atoms, and 2,5-dimercapto-1,3,4-thiadiazole, in small but sufficient amounts to substantially inhibit bacteria growth in said dispersion, said formaldehyde, aliphatic mercaptan and 2,5-dimercapto-1,3,4-thiadiazole being reacted in the molar ratio of from 2:2:1 to 10:2:9.

17. The method of inhibiting bacteria growth in emulsions of soluble oil compositions comprising a major proportion of a hydrocarbon oil and an emulsifying agent, and the method of inhibiting corrosion of metal surfaces in contact with said emulsions, comprising incorporating in said soluble oil composition from about 0.5% to about 10% of the oil-soluble reaction product of an aldehyde, a mercaptan selected from the class consisting of an aliphatic mercaptan and an aromatic mercaptan, and 2,5-dimercapto-1,3,4-thiadiazole, said aldehyde, mercaptan and 2,5-dimercapto-1,3,4-thiadiazole being reacted in the molar ratio of from 2:2:1 to 10:2:9.

References Cited in the file of this patent

UNITED STATES PATENTS

| | | |
|---|---|---|
| 2,154,096 | Loane | Apr. 11, 1939 |
| 2,597,838 | Lowe et al. | May 20, 1952 |
| 2,607,737 | Woodruff et al. | Aug. 19, 1952 |